(No Model.) 2 Sheets—Sheet 1.

H. H. WESTINGHOUSE & W. A. BOLE.
SHAFT COUPLING.

No. 492,898. Patented Mar. 7, 1893.

WITNESSES: INVENTORS:

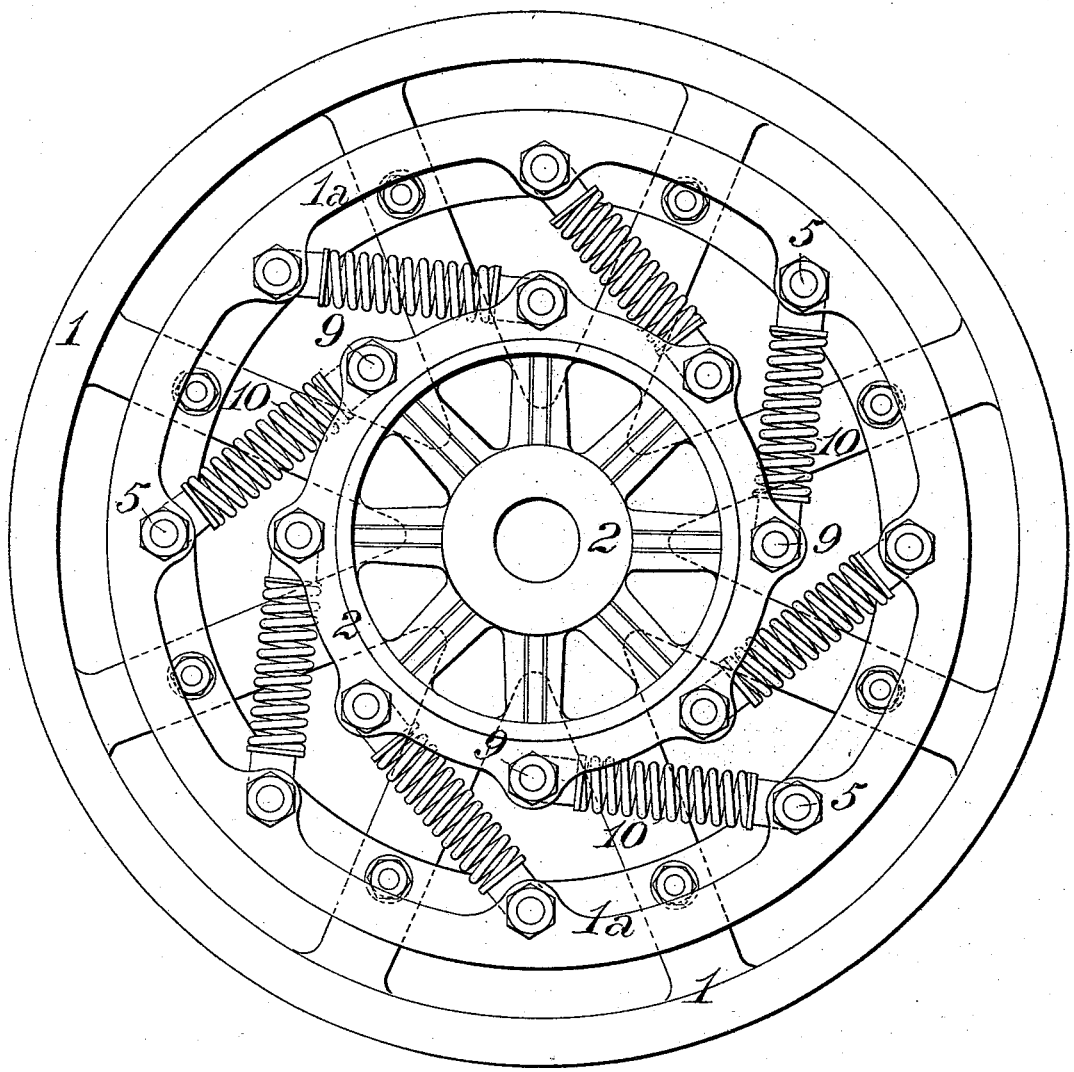

UNITED STATES PATENT OFFICE.

HENRY HERMAN WESTINGHOUSE AND WILLIAM A. BOLE, OF PITTSBURG, PENNSYLVANIA.

SHAFT-COUPLING.

SPECIFICATION forming part of Letters Patent No. 492,898, dated March 7, 1893.

Application filed June 30, 1892. Serial No. 438,627. (No model.)

*To all whom it may concern:*

Be it known that we, HENRY HERMAN WESTINGHOUSE and WILLIAM A. BOLE, citizens of the United States, residing at Pittsburg, in the county of Allegheny and State of Pennsylvania, have invented or discovered a certain new and useful Improvement in Shaft-Couplings, of which improvement the following is a specification.

Our improvement relates to shaft couplings of the flexible class or type, in which provision is made for variation from axial alignment of the connected sections, and an elastic application of driving power is effected.

The object of our invention is to provide a shaft coupling of such type having a greater capacity of flexibility than heretofore, and in which the transmission of driving power will be divided uniformly between the several elastic connecting members through which it is imparted.

To this end, our invention, generally stated, consists in the combination of two coupling heads or frames, each adapted to be fixed upon an independent shaft section, and a series of tangentially disposed springs, each coupled at one end to one of the coupling heads, and at the opposite end to the other coupling head; also in the combination with a shaft coupling as specified, of an insulating medium, interposed between the main portion of one of the coupling heads and the members connecting the same with the other coupling head. The improvement claimed is hereinafter fully set forth.

Figure 2:
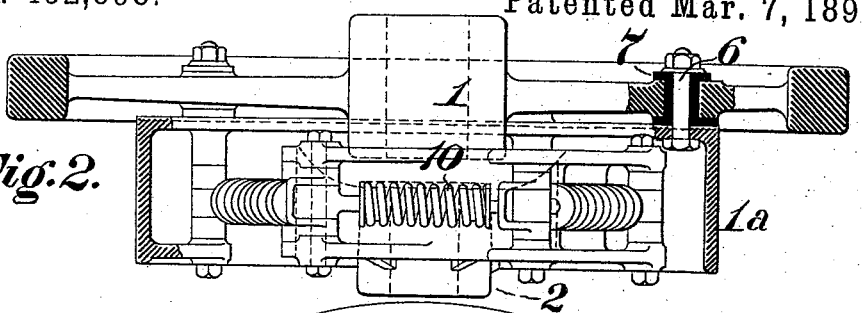
Figure 1:
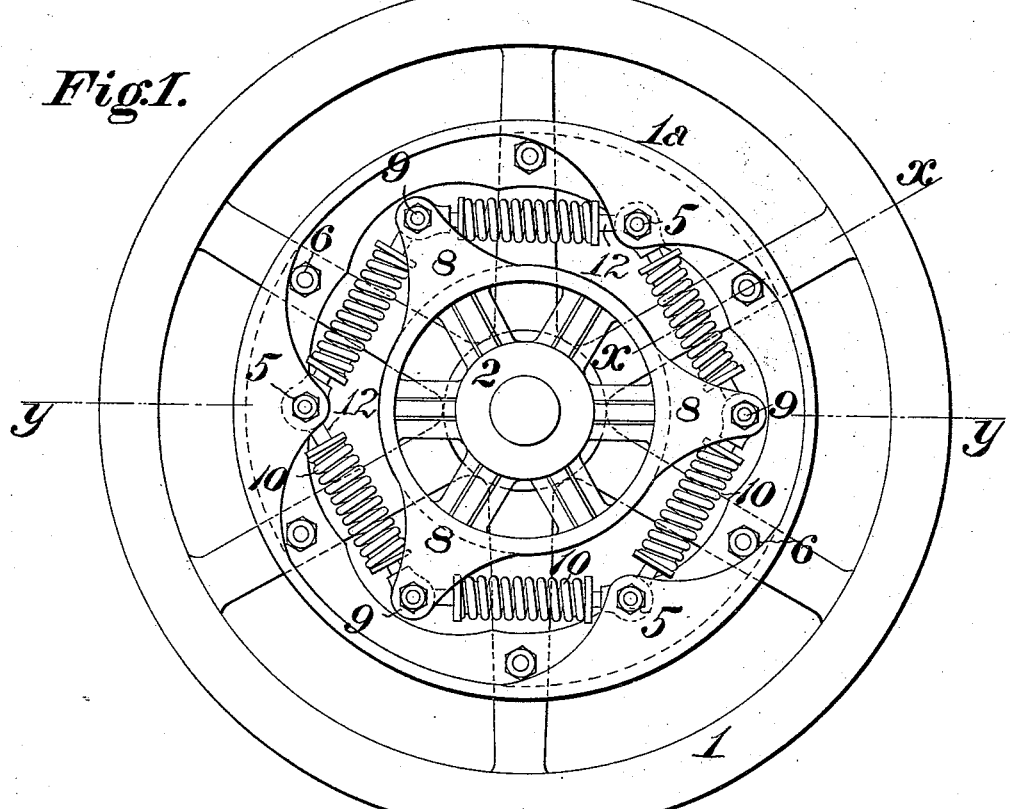
Figure 3:
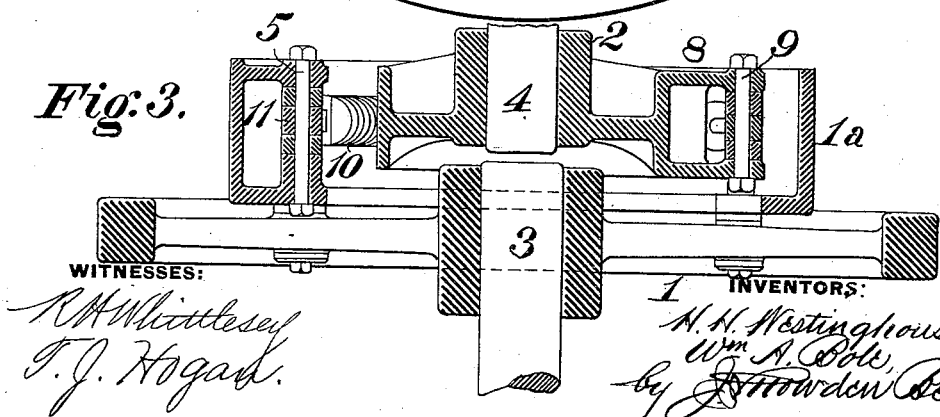

In the accompanying drawings: Figure 1 is an end view, in elevation, of a shaft coupling illustrating an application of our invention; Fig. 2, a view, partly in side elevation and partly in transverse section at the line $x, x$, of Fig. 1; Fig. 3, a transverse section at the line $y, y$, of Fig. 1, and; Fig. 4, an end view, in elevation, illustrating a modification in the disposition of the springs.

In the practice of our invention, referring to Figs. 1, 2, and 3, we provide two coupling heads or frames, 1, 2, which are provided with central hubs, adapted, respectively, to be secured upon the sections 3, 4, of shafting to be coupled together. The main body of the head 1 is preferably, as shown, in the form of a spoked wheel to the spokes of which there is secured, concentrically, an annular flanged supplemental section $1^a$, provided with a series of suitable coupling connections, as in the instances shown, pins or bolts 5, fitted, with their axes substantially parallel to the axis of the head 1. The supplemental section $1^a$ is secured to the head 1, by bolts 6, direct contact of the connected members with each other, and with the connecting bolt 6, being prevented by thimbles 7, of any suitable insulating material, surrounding the bolts and provided with end flanges which prevent contact of metal with metal, at the ends of the bolts.

The head 2, which is secured upon the shaft section 4, is in the form of a wheel or disk, which is, similarly to the supplemental section $1^a$ of the head 1, provided with a series of coupling connections, said head 2 having, in the form herein shown, peripheral lugs or bearings 8, in which are fitted a series of coupling pins or bolts 9, corresponding in number with the pins 5 which are fitted in the supplemental section $1^a$ of the head 1, and having, like the latter, their axes substantially parallel with the axis of the head on which they are carried. The outer diameter of the head 2, both over its lugs 8, and on its body, is sufficiently less than the inner diameter of the body of the supplemental section $1^a$ of the head 1, and the diametrical distance between its lugs 5, to allow free lateral movement of the heads 1 and 2, and the shaft sections to which they are secured, relatively one to the other.

The heads 1 and 2 are so arranged that the coupling pins 5 of the former shall alternate in position with the pins 9 of the latter, and the alternate pins are connected one to another by a series of helical springs 10, which are disposed tangentially, that is to say, the axial line of each spring is substantially tangential to a circle described about the center of the coupling head to which one end of the spring is coupled, and passing through the point of connection of the spring to said head. The springs 10 are so coiled as to be capable of either extension or compression, and one end of each spring is coupled to one of the bolts 5, and the opposite end to one of the bolts 9. Each coupling pin of each head is therefore, as shown in Fig. 1, connected, by oppositely extending springs, with the two adjacent coupling pins of the other head. In the rotation of the coupled shaft sections in either direction, either being the driving member, the driving power is imparted to the other shaft section through the series of springs 10, and as two of these are coupled to each of the pins 5 of the supplemental section 1ª of the head 1, and two to each of the pins 9 of the head 2, it will be seen that one half of the series of springs will be under uniform tension and act to elastically transmit the driving power to the driven section, while the other half of the series will be subject uniformly to compression, and will so transmit the driving power, as well as, by their elasticity, serve to cushion and reduce jars due to any inequalities or sudden variations in power or resistance.

By reason of the tangential disposition of the several springs of the series, as hereinbefore specified, a greater range of variation of alignment of the coupled shaft sections is admissible, without distortion or other injury to the springs, than where, as in prior instances in the art, the shaft sections are connected by springs whose common axial line is coincident with the normal axial line of the shaft sections. It will further be seen that as each of the series of coupling springs 10, is not opposed or restricted as to movement by any bearing surface between its end connections, and there being free space provided between each end connection and the opposite coupling head as before described, lateral movement of the shaft sections, under variations of alignment, is fully provided for and permitted. The springs 10 are positively connected at their ends, to the pins 5 and 9, by blocks 11, fitting truly thereon, so as to provide ample bearing surface. The blocks 11 are provided with end stems 12 connected to the springs in any suitable and convenient manner so as to be substantially integral with the springs, as by blocks grooved externally to fit within the coils of the springs. As shown in Figs. 2 and 3, one of the blocks 11 on each coupling pin, is divided, so as to provide two bearings, fitting the pin on opposite sides of the bearing of the other block thereon.

The modification illustrated in Fig. 4, differs from that before described in the particular that all of the series of springs are subject either to tension or to compression (according to the direction of rotation of the coupled shaft sections, or to the section which is employed as the driving member) in lieu of one-half the series of springs being subject, in operation, to tension, and the other half to compression, as in the previous instance. Each of the springs 10, is, in Fig. 4, as in the previous instance, coupled at one end to a pin 5 of the section 1ª, and, at the other, to a pin 9 of the head 2, but the pins of the respective heads are not, as before, necessarily alternated in position, nor is each pin of one head coupled by oppositely extending springs to two pins of the other head. It therefore results that all the springs will transmit the driving power from one to the other shaft section either under tension or under compression, accordingly as may be determined by the direction of rotation or the selection of the driving member.

While we have specified pins or bolts as the preferred means for connecting the springs to the coupling heads, deeming these to be most convenient and desirable for the purpose, we do not desire to limit ourselves to such specific form of attachment, as any other suitable means for connecting the springs alternately to one and the other head, would similarly perform the same function and, in the operation of the coupling, act as a mechanical equivalent for that shown.

It will be seen that under our invention as above described, a material range of flexibility is afforded in the coupling, so as to admit of variations of alignment of either or both of the coupled sections, without interfering with their rotation or imparting injurious strain to the connecting members. Thus, the shafts may rotate, with a substantially uniform division of the transmission of driving power among the several springs, either when in the normal condition of being in common axial line, or when either or both shafts should be at an angle to the normal axial line, or when both shafts should be in such position that their axial lines would fail to meet.

We claim as our invention and desire to secure by Letters Patent—

1. The combination, in a shaft coupling, of two coupling heads, fixed upon independent shaft sections and wholly disengaged one from the other so as to have a free range of relative lateral movement, and a series of tangentially disposed springs, each coupled at one end to one head and at its opposite end to the other, and being located in an annular space between the coupling heads which is of greater transverse dimensions than the diameter of the springs, so as to have the capacity of lateral movement with either or both coupling heads, substantially as set forth.

2. The combination, in a shaft coupling, of two coupling heads, fixed upon independent shaft sections and wholly disengaged one from the other, so as to have a free range of lateral movement, a series of coupling pins fitted in each head, and a series of tangentially disposed springs, each coupled at one end to a coupling pin of one head and at its opposite end to a coupling pin of the other, and being located in an annular space between the coupling heads which is of greater transverse dimensions than the diameter of the springs, so as to have the capacity of lateral movement with either or both coupling heads, substantially as set forth.

3. The combination, in a shaft coupling, of two coupling heads, each adapted to be fixed upon a shaft section, and a series of springs connecting said heads, one to the other, each point of spring attachment upon either head being coupled, in opposite directions, respectively, to two points on the other, substantially as set forth.

4. The combination, in a shaft coupling, of two coupling heads, each adapted to be fixed upon a shaft section, a series of coupling pins fitted in each head, the pins of one head being alternated in position, relatively to those of the other, and a series of springs connecting a coupling pin of one head with the two adjacent coupling pins of the other head, substantially as set forth.

5. The combination, in a shaft coupling, of two coupling heads, each adapted to be secured upon a shaft section, one of said heads being divided into two sections, an insulating medium interposed between said sections at their point of connection, a series of coupling pins fitted in one of said sections, a series of coupling pins fitted in the other head, and a series of springs, each coupled at one end to a coupling pin of one head and at its opposite end to a coupling pin of the other, substantially as set forth.

In testimony whereof we have hereunto set our hands.

HENRY HERMAN WESTINGHOUSE.
WM. A. BOLE.

Witnesses:
J. SNOWDEN BELL,
R. H. WHITTLESEY.